March 6, 1956     R. W. SMITH     2,737,268
STRUCTURAL MEMBER AND CONNECTION MEANS THEREFOR
Filed April 3, 1951
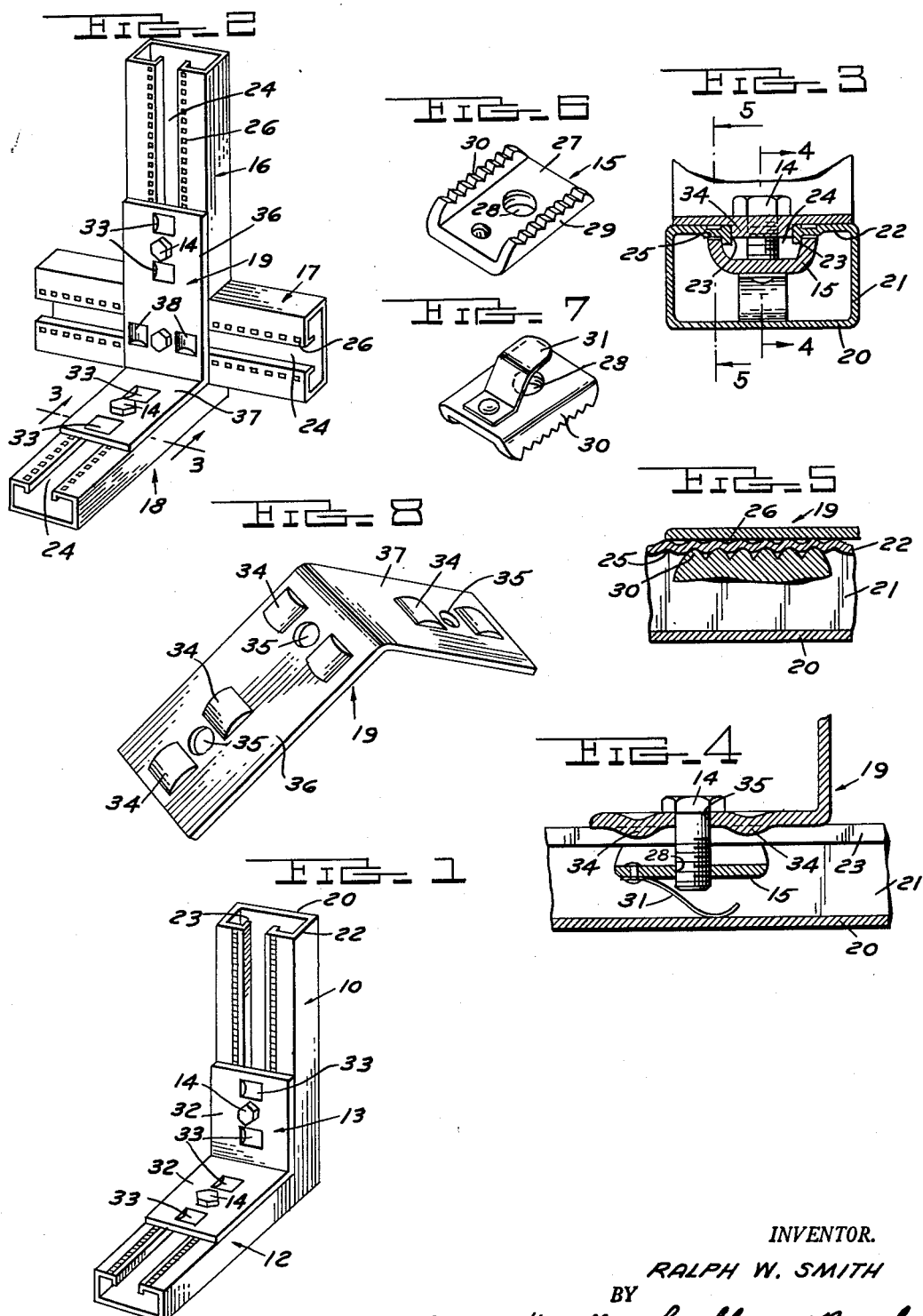
INVENTOR.
RALPH W. SMITH
BY
Barnes, Kisselle, Laughlin & Raisch
ATTORNEYS

United States Patent Office 2,737,268
Patented Mar. 6, 1956

2,737,268

STRUCTURAL MEMBER AND CONNECTION MEANS THEREFOR

Ralph W. Smith, Harrow, Ontario, Canada

Application April 3, 1951, Serial No. 219,013

5 Claims. (Cl. 189—36)

This invention relates to structural members and connection means therefor and more particularly to structural members adapted for knock-down assembly such as for erecting scaffolding, frames, ladders and the like.

It is an object of this invention to provide structural members which can be secured together to provide a very rigid assembly and which, at the same time, are designed such that they can be assembled and disassembled quickly and with a minimum of effort.

A further object of the invention resides in the provision of structural members which can be interconnected in various positions of adjustment so that the structure provided thereby, such as a scaffold, may, with substantially the same individual members, be changed in shape and size in a minimum of time.

More specifically, the invention contemplates structural members and connection means therefor generally of the type illustrated in U. S. Patent No. 2,345,650 wherein the structural members comprise channel-shaped struts or braces the free edges of which are turned inwardly towards each other and provided with flanges which extend inwardly in the direction of the closed face of the channel members. In the above mentioned U. S. patent these channels are secured together by a bolt and a nut, the nut being positioned within the channel member and provided with two series of teeth which, when the bolt is tightened, bite into the edges of the inwardly turned flanges on the channel members.

In my arrangement both the nut and the channel member are provided with preformed teeth, the teeth on the channel member being disposed on a body portion of the channel rather than at the edge portions of the inwardly turned flanges. I have found that the formation of teeth on the body portion of the channel is highly desirable not only from the standpoint of the ease with which the structural members can be assembled but also from the standpoint of strength and rigidity of the connection between the structural members.

In the drawings:

Fig. 1 is a perspective view of a pair of struts interconnected at their ends in accordance with the present invention.

Fig. 2 is a perspective view of three strut members interconnected in accordance with the present invention.

Fig. 3 is a sectional view along the lines 3—3 in Fig. 2.

Fig. 4 is a sectional view along the lines 4—4 in Fig. 3.

Fig. 5 is a sectional view along the lines 5—5 in Fig. 3.

Fig. 6 is a top perspective view of the nut shown in section in Fig. 3.

Fig. 7 is a bottom perspective view of the nut.

Fig. 8 is a perspective view of the corner bracket shown in Fig. 2.

Referring to the drawings and particularly to Fig. 1, the invention contemplates a strut member 10 which is adapted to be connected with a similarly constructed strut member 12 by a corner bracket 13 which is secured to the respective strut members 10 and 12 by means of the bolts 14 and specially shaped nuts 15 (Fig. 6). In Fig. 1 two strut members are shown connected to form a right angle joint while in Fig. 2 three strut members designated 16, 17 and 18, respectively, are shown connected together by a bracket 19 to provide a corner construction such as might be employed on a scaffold or the like. All of the strut members are of the same construction and comprise a body portion (Fig. 3) having a bottom wall or web 20 and a pair of side walls 21 which are turned inwardly along their free edge portions to provide inwardly turned flanges 22 at the open face of the strut member. The extreme edge portions of flanges 22 are turned inwardly towards web 20 to provide a pair of parallel spaced ribs 23 which define therebetween a longitudinal slot 24. Slot 24 extends axially of the strut member. On the inner face thereof and along a line spaced adjacent rib members 23, the flanges 22 are each provided with a row of serrations 25. Serrations 25 are preferably formed by stamping or crimping the metal in flanges 22, and although they are primarily disposed on the inner face of flange 22, it will be noted that they also appear as a row of indentations 26 on the outer faces of these flanges.

Referring now to Figs. 6 and 7, the nut member 15 is U-shaped and has a flat body portion 27 provided with a centrally disposed threaded hole 28 with which the bolt 14 is adapted to be threadedly engaged. Along each side body portion 27 is fashioned with upstanding flanges 29 the free edges of which are serrated as at 30. Flanges 29 preferably extend from the body portion 27 of nut 15 in slightly diverging directions so that, when the nut is arranged within the strut member, the flanges 29 engage the ribs 23 on the strut member and the serrations 30 on nut 15 interfit with the serrations 25 on the strut member. Nut 15 is resiliently biased into engagement with the serrations 25 by leaf spring 31 which is secured at one end to the underside of body portion 27 with its free end engaging the inner face of the base wall 20 of the strut.

Corner brackets 13 and 19 are preferably formed from the metal straps which are bent transversely to the desired angle of the bracket. In most instances these brackets will be bent to provide two legs 32 which are perpendicular to each other. Where the bracket is to be utilized for securing only two strut members together to form a corner construction such as is illustrated in Fig. 1, each leg 32 will be formed with a pair of spaced indentations 33. Indentations 33 are disposed such as to extend axially of each of the connected strut members and are dimensioned to provide on the underface of each leg spaced projections 34 which interfit with the slot 24 on the strut member. Between each pair of spaced indentations 33 each leg 32 of the corner bracket is apertured as at 35 to receive the shank of the headed bolt 14.

When it is desired to connect two of the strut members such as those illustrated at 10 and 12 in Fig. 1, the struts are arranged perpendicularly to each other with the end face of one strut abutting the outer face of flanges 22 on the other strut. The nut members 15 are inserted within the channel-shaped strut with the serrated edges 30 thereof interengaged with the serrations 25 on flanges 22. Nut member 15 is adapted to be inserted into the strut member either from the open end of the strut member or, if desired, the nut may be inserted through slot 24 by tilting the nut at an angle to the plane of flanges 22 and introducing first one flange 29 of the nut into slot 24 and then the other flange of the nut. Thereafter the nut may, by pressing, be manipulated into the position illustrated in Fig. 3.

It will be observed that the nut may be adjusted longitudinally of the strut member by simply pushing the nut inwardly of the channel and sliding it lengthwise of slot 24 to the desired position. When the pressure on the nut is released, spring 31 serves to bias the nut into engagement with the serrations 25 on the inner face of flanges 22. It will be appreciated therefore that the spring 31 and the interengaged serrations 25 and 30 eliminate the necessity for holding the nut at the position in which it is to be retained within the channel-shaped strut member. This is true even though the strut member is vertically disposed. The joint between the two strut members 10 and 12 is completed by placing the corner bracket 13 within the right angle corner formed by the two strut members and threading bolt 14 into the threaded hole 28 in nut 15. The interengaged serrations 25 and 30 form means for positively locating the nut in a fixed position along the channel-shaped strut, and I have found that this arrangement facilitates assembly because the nut 15 does not become accidentally shifted when the strut members and the corner brackets are manipulated into position.

When bolt 14 is tightened, it will be observed that nut 15 is drawn tightly against the solid underside of flanges 22 with the serrations 30 on the nut firmly engaged with the serrations 25 on the flange members 22. In other words the nut is clamped firmly against a solid backing. At the same time it will be observed that, as the bolt is tightened, flanges 29 engage ribs 23 and tend to squeeze these rib members together and against the projections 34 on corner bracket 13 to provide a very rigid connection. Projections 34 on each leg of the corner bracket 13 engage the ribs 23 and locate the corner bracket on the strut so that there is no tendency for the corner bracket 13 to turn on the strut member when the bolt 14 is being tightened.

In the form of connection illustrated in Fig. 2 the three strut members 16, 17 and 18 are connected together by the corner bracket 19 which is somewhat similar to the corner bracket 13. Bracket 19, however, has one leg portion 36 which is substantially twice the length of the other leg portion 37. Each of the legs 36 and 37 are provided with the axially aligned indentations 33 as in the form of corner construction illustrated in Fig. 1. Leg 36 has, in addition, a second pair of spaced indentations 38 which are aligned in a direction transversely of the indentations 33 on leg 36. In this arrangement it will be observed that the three strut members are positioned with one side wall 21 of strut 17 resting upon flanges 22 at the end of strut 18 and with the end face of strut 16 positioned upon the other side wall 21 of strut 17. The three struts are therefore arranged perpendicularly relative to each other. Angle bracket 19 is shaped such that, when it is applied to the corner arrangement illustrated in Fig. 2, the indentations 33 on leg 37 align with and interengage the slot 24 on strut 18, the indentations 33 interengage with the slot 24 on strut member 16, and the indentations 38 on leg 36 interengage with the slot 24 on strut 17. These members are thereafter secured together by the bolts 14 and nuts 15 as shown and as hereinbefore described.

Thus it will be seen that I have provided structural members and connection means therefor which are economical to manufacture and which, at the same time, can be assembled to provide a very rigid structure. It will be noted that when the bolts 14 are tightened the flanges 22 are clamped tightly between the serrated edges 26 of the nut 15 and the underfaces of the corner bracket 13 or 19. Furthermore, it will be noted that the flanges 29 on nut 15 are designed to clamp the ribs 23 against the projections 34 on the underfaces of corner brackets 13 and 19 when the bolt 14 is tightened. In addition, it will be appreciated that the channel-shaped structural members can be assembled or disassembled in a minimum of time with little effort, since the spring 31 cooperates with the serrated edges 25 and 30 to resiliently retain the nuts 15 in the position in which they are adjusted along the channel-shaped member.

I claim:

1. In a structural assembly the combination of a channel-shaped structural member having a pair of side walls connected along a set of corresponding edges thereof by a web portion, said side walls having inwardly turned flanges along their free edges and said flanges having the longitudinal edge portions thereof turned inwardly to form a pair of spaced ribs extending longitudinally along and projecting inwardly of the open face of said channel member, said inwardly turned flanges having preformed serrations on the inner face thereof which extend along lines spaced laterally outwardly of said spaced ribs, a securing member within said channel member having a pair of serrated edge portions interengaged with some of the preformed serrations on said flanges to prevent relative longitudinal movement of said securing and channel members, and means associated with said securing member for clamping said securing member against the inner faces of said flanges, said securing member having adjacent said serrated edge portions a pair of wall portions tapering laterally outwardly in a direction towards the open face of said channel member, said tapering wall portions being spaced apart to engage said rib members and tending to bend said rib members inwardly towards each other when said last mentioned means are manipulated to clamp said securing member against the inner faces of said flanges.

2. The combination set forth in claim 1 wherein said securing member is generally U-shaped with the serrations thereon extending along the free edges of the legs of said U, the legs of said U diverging in a direction away from the bight portion thereof and comprising said tapering wall portions, said legs being greater in length from the bight portion to the free ends thereof than the height of said spaced ribs and being spaced apart adjacent the bight portions of said U a distance less than the spacing between said spaced ribs.

3. The combination set forth in claim 1 including a bracket member having a base portion positioned against the outer face of said flanges, said clamping means being arranged to clamp said bracket and said securing member together against opposite faces of said flanges, said base portion having lug means thereon projecting into the space between said spaced-apart ribs, said ribs being pressed laterally into engagement with said lug means when said securing member is clamped by said clamping means against the inner faces of said flanges.

4. In a structural assembly the combination of a channel-shaped structural member having a pair of side walls connected along a set of corresponding edges thereof by a web portion, said side walls having inwardly turned flanges along their free edges and said flanges having the longitudinal edge portions thereof turned inwardly to form a pair of spaced ribs extending longitudinally along and projecting inwardly of the open face of said channel member, said inwardly turned flanges having preformed serrations on the inner face thereof which extend along lines spaced laterally outwardly of said spaced ribs, a securing member within said channel member having a pair of serrated edge portions interengaged with some of the preformed serrations on said flanges to prevent relative longitudinal movement of said securing and channel members, and means associated with said securing member for clamping said securing member against the inner faces of said flanges, said securing member having a pair of laterally-spaced and oppositely-inclined wall portions, said wall portions being disposed to engage said ribs when the serrations on said securing member are engaged with the serrations on said flanges, the inclination of said wall portions being in a direction transversely of the longitudinal axis of said channel member whereby said wall portions exert a pressure on said ribs in a direction transversely of the longitudinal axis of said channel member when said securing member is drawn tightly against the inner faces of said flanges.

5. In a structural assembly the combination of a channel-shaped structural member having a pair of side walls connected along a set of corresponding edges thereof by a web portion, said side walls having inwardly turned substantially flat flanges along their free edges and said flanges having the longitudinal edge portions thereof turned inwardly toward said web portion to form a pair of spaced ribs extending longitudinally along and projecting inwardly of the open face of said channel member, said inwardly turned flanges having preformed serrations on the inner face thereof spaced adjacent and laterally outwardly of said spaced ribs, a U-shaped nut within said channel member, the bight portion of said U-shaped nut spanning said spaced ribs and having a threaded aperture therein, the extreme end portions of the legs of said U-shaped nut being serrated and being interengaged with some of the preformed serrations on said flanges to prevent relative longitudinal movement of said nut and channel member, a support member comprising a bracket having a relatively flat face in co-planar engagement with the outer face of said generally flat flanges at least at the portion thereof opposite said serrations and a threaded member engaged in said threaded aperture of said nut and extending through the space between said ribs and said support member for clamping said flanges between the serrated edges of said U-shaped nut and the face of said support member, said threaded member comprising a bolt having a head engaging the exposed face of said bracket, said bracket having lugs on the face thereof which is in co-planar engagement with the outer face of said flanges, said lugs projecting between and engaging said spaced ribs to prevent relative rotation between said bracket and said channel member, the legs of said nut being inclined to engage said ribs and clamp them against said lugs.

References Cited in the file of this patent
UNITED STATES PATENTS

| | | |
|---|---|---|
| 118,253 | Hull | Aug. 22, 1871 |
| 569,270 | Winslow | Oct. 13, 1896 |
| 1,197,052 | Newhall | Sept. 5, 1916 |
| 1,872,385 | Andren | Aug. 16, 1932 |
| 1,933,536 | Awbrey | Nov. 7, 1933 |
| 2,345,650 | Attwood | Apr. 4, 1944 |
| 2,380,379 | Attwood | July 31, 1945 |